Sept. 26, 1967 C. J. TELLEN 3,343,667

LOCKING MECHANISM FOR WRAP-AROUND COVER FOR TAPE REELS

Filed Sept. 23, 1965

INVENTOR
CHESTER J. TELLEN

By Bair, Freeman & Molinare Attys.

United States Patent Office 3,343,667
Patented Sept. 26, 1967

3,343,667
LOCKING MECHANISM FOR WRAP-AROUND COVER FOR TAPE REELS

Chester J. Tellen, Mount Prospect, Ill., assignor to Amerline Corporation, a corporation of Illinois Filed Sept. 23, 1965, Ser. No. 489,581
10 Claims. (Cl. 206—52)

This invention relates to an improved device for locking the end portions of a wrap-around type tape reel cover together.

In U.S. patent application Ser. No. 368,007 now U.S. Patent No. 3,235,067, there is shown a wrap-around type tape reel cover. In order to maintain the ends of a tape reel cover of this type into locking engagement, a latching mechanism must be provided. In the device of the foregoing application, the toggle type locking device shown therein has certain disadvantages.

The disadvantage of this toggle type locking device results from the fact that the toggle moves the ends of the wrap-around tape reel cover into locking engagement at only one particular diameter. Since tape reels and tape reel covers are generally constructed by molding techniques, tolerance variations result in the outer diameter and circumference of the flanges of the tape reels, and also in the diameters and circumferences of the wrap-around covers. Thus, in the case of a toggle type locking mechanism, if an oversize wrap-around cover is used to cover a tape reel having undersized flanges, the cover will not enclose the tape reel in the desired sealing relationship. It is very important that computer tapes be maintained in a dust-free condition so that there are no problems associated with proper reading of the tape as it passes through a computer. Also, if a reel is oversize and a wrap-around is undersize, the locking mechanism will not be able to lock the cover about the reel.

It is therefore an important object of this invention to provide an improved locking device for a wrap-around type tape reel cover wherein the disadvantages of prior art locking devices for wrap-around covers are substantially avoided.

It is also an object of this invention to provide an improved locking device for a wrap-around type tape reel cover wherein the locking mechanism maintains the tape reel in dust-sealing relaitonship with the cover regardless of the dimensional variations of the tape reel flanges and of the wrap-around cover.

It is a further object of this invention to provide an improved locking device for wrap-around type tape reel covers wherein the device is characterized by its simplicity and economy of construction, manufacture, and use.

Further purposes and objects of this invention will appear as the specification proceeds.

A particular embodiment of the present invention is illustrated in the accompanying drawings wherein.

Figure 1:
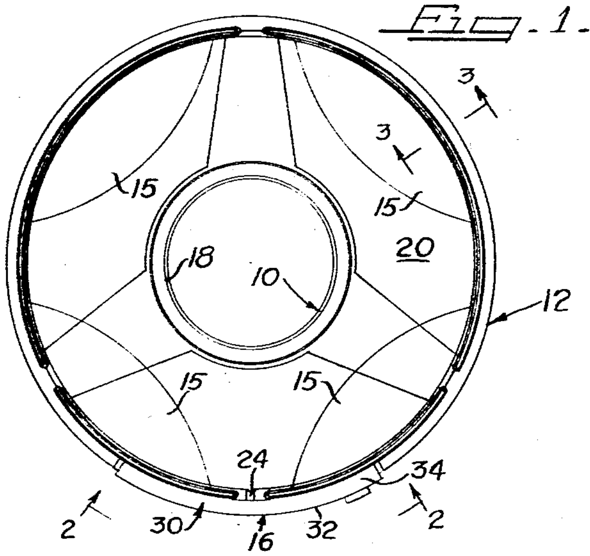
FIGURE 1 is a bottom plan view of a tape reel having a cover utilizing my improved locking mechanism mounted thereon.
Figure 3:
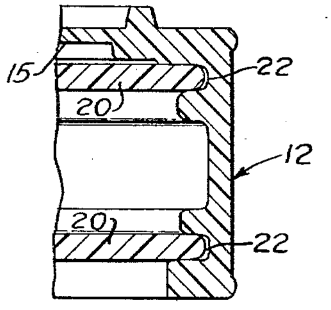
FIGURE 3 is an enlarged sectional view taken along the line 3—3 of FIGURE 1.
Figure 2:
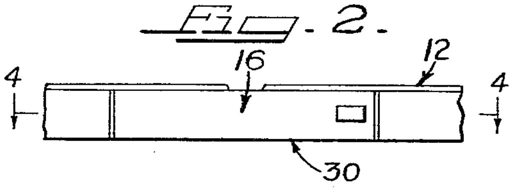
FIGURE 2 is a fragmentary side elevational view of the locking mechanism utilized in the embodiment of FIGURE 1, as viewed along the line 2—2 of FIGURE 1.

Referring particularly to FIGURES 1 and 3, a tape reel 10 is shown in dust-sealing relationship with a wrap-around cover member 12. The end portions 14 of the wrap-around are maintained in abutting and dust-sealing relationship by means of the locking device, generally 16, while mounted on the reel 10. The wrap-around 12 includes inwardly projecting flanges 15 which align the reel 10 with the cover 12.

The tape reel 10 is of conventional construction and is provided with a central hub 18 having parallel annular flanges 20 projecting outwardly therefrom. The wrap-around cover member 12 is of a construction generally similar to that set forth in the above-mentioned co-pending application Ser. No. 368,007, now U.S. Patent No. 3,235,067. The web portion of the cover 12 is provided with continuous parallel slots or grooves 22 along the inner periphery of the wrap-around 12. The grooves 22 snugly receive the outer peripheries or edges of the flanges 20 therein to provide substantially dust-sealing relationship. Desirably, a resilient sealing member 24 is secured to one abutting end portion 14 of the wrap-around 12 so that dust-sealing relationship is maintained between the abutting ends 14 of the wrap-around cover, regardless of whether the ends are adjacent each other or are in a separated condition.

The important feature of the present invention is the locking device 16 which maintains the cover 12 and the reel 10 in the desired dust-sealing relationship, regardless of the dimensional variations of the flanges 20 of a reel 10 or of the dimensions of the wrap-around 12 itself. My locking device 16 maintains the desired relationship between the reel and cover regardless of whether the reel flanges or wrap-around are oversized or undersized since the locking device 16 provides for slidable or adjustable locking relationship between the end portions of the cover 12.

Figures 4, 5:
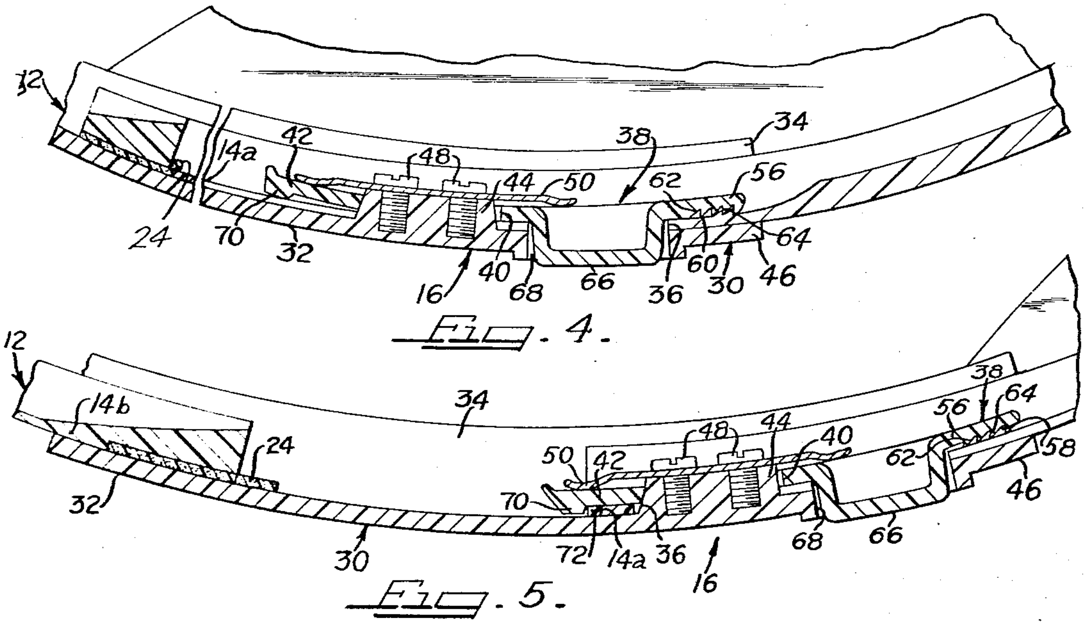
FIGURE 4 is an enlarged sectional view taken along the line 4—4 of FIGURE 2, wherein the locking mechanism is shown in the closed position.
FIGURE 5 is a view similar to FIGURE 4 except that the locking mechanism is shown in the open position.

The locking mechanism 16, shown most clearly in FIGURES 4 and 5 includes a shield or overlapping member 30. The shield 30 is provided with an outer wall 32 of arcuate shape having the same radius as the outer periphery of the wrap-around cover 12. Upper and lower inwardly projecting flanges are provided on the shield 30 to assist in maintaining the sliding end portion $14^a$ of the wrap-around cover 12 in alignment with the fixed end portion $14^b$ of the wrap-around 12. The shield member 30 is adhesively or otherwise secured to the fixed end portion $14^b$ of the cover. The shield flanges 34, together with the wall 32, define a track for slidably receiving the sliding end portion $14^a$ therebetween for enabling movement of the ends $14^a$ and $14^b$ into abutting or closely adjacent relationship.

The sliding end portion $14^a$ has an elongated longitudinal slot 36 defined at its central portion. The length of the slot, as will be hereinafter described in greater detail, limits the distance that the sliding end $14^a$ may be moved relative to the fixed end $14^b$.

A retainer member 38 is resiliently mounted along the inner surface of the shield 30. As seen most clearly in FIGURE 4, the retainer 38 is provided with a substantially rectangular aperture 40 in its planar portion 42.

The aperture 40 is snugly received in place by an inwardly extending, substantially rectangular, boss 44 located at the free end portion 46 of the shield member 30. The retainer 38 is resiliently maintained in place by leaf spring member 50 which biases the retainer towards the inner surface of the overlap member 30. The leaf spring 50 is secured to the boss 44 by screws 48 and includes front and rear portions 52 and 54 which extend beyond the longitudinal ends of the boss 44 to bias the planar wall 42 and leading portion 56 of the retainer 38 in an outward direction.

The leading or forward portion 56 of the retainer 38 is provided with outwardly facing ratchet teeth 58 which engage inwardly facing ratchet teeth 60 on the inner surface of the sliding end 14ª of the wrap-around 12. The wrap-around ratchet teeth 60 are located adjacent the inner end of the slot 36. Both the teeth 58 and 60 are positioned in a direction transverse to the length of the slot 36. The teeth 58 and 60 are each formed by an inclined surface 62 and an upright surface 64. The inclined surfaces 62 of the teeth are inclined in the direction of the locking relative movement between the retainer teeth 58 and the wrap-around teeth 60. In the locked condition, the abutting upright walls 62 on the teeth 58 and 60 resist movement in the opening direction. By this construction, positive locking engagement is provided between the teeth. In order to disengage the teeth 58 and 60 after they have been engaged, a button or outwardly projecting portion 66 is provided at the forward portion 56 of the retainer 38. The button 66 projects through the slot 36 and through an aperture 68 provided in the forward portion of the shield 30 upon pushing the button 66 inwardly in opposition to the biasing pressure of the leaf spring 50 thereagainst, the retainer teeth 58 are disengaged from the wrap around teeth 60 so that the sliding wrap-around end 14ª may be moved to the open position, as shown in FIGURE 5.

When in the open position, an outwardly projecting lip 70 at the rear end of the retainer 38 engages the outer end 72 of the sliding end 14ª of the reel cover 12 so that the device is positively maintained in the open position. This enables the tape reel 10 to be easily removed from association with the cover 12 without interference from any part of the cover.

The wrap-around 12, the retainer 38, and the shield are all desirably made by injection molding of plastic. Preferably, the wrap-around is made of acrylonitrile, the retainer is made of an acetal resin, and the shield is made of acrylonitrile.

It is seen from the foregoing description that my construction provides for sliding movement between the locking mechanism 16 and one end portion of the wrap-around cover 12. The locking mechanism is provided with a retainer member 38 having ratchet teeth 58 which easily move into sliding engagement with ratchet teeth 60 provided on the inner periphery of the wrap-around member 12 due to the inclined surfaces on the teeth. Since there is a plurality of teeth on both the wrap-around 12, as two teeth, and on the retainer 38, as four teeth, there are a multiplicity of positions for the lock 16 in the locked position. Thus, the wrap-around cover 12 in conjunction with the locking device 16 tightly maintains the cover 12 in dust-sealing relationship with the flanges 20 of the tape reel 12 regardless of the variations in dimensions of these parts. This is in contrast to the prior art devices wherein there is only one locked position. Thus, regardless of oversizing and undersizing of the cooperating or mating parts, the present invention provides a dust-sealing cover for computer tapes.

While in the foregoing there has been provided a detailed description of a particular embodiment of the present invention, it is to be understood that all equivalents obvious to those having skill in the art are to be included within the scope of the invention as claimed.

What I claim and desire to secure by Letters Patent is:

1. A device for locking together the end portions of a wrap-around type tape reel cover, said device comprising an overlap member fixed to one end portion of said cover, the other end portion of said cover slidably received by said overlap member, a longitudinal slot having an inner end in said other end portion, teeth on said cover at said inner end of said slot, a retainer member mounted on said overlap member and engaging said slot, and teeth on said retainer member engaging the teeth at said inner end of said slot to thereby maintain said wrap-around cover in a locked condition around said reel regardless of the dimensional variations of said cover and of said reel.

2. A device for locking together the first and second end portions of a wrap-around type tape reel cover, said device comprising an overlap member fixed to the first end portion of said cover, the second end portion of said cover being slidably received by said overlap member, an elongated slot having an inner terminal portion in said second end portion, engaging means at said terminal portion, and means mounted in said overlap member and including means positioned within said slot for cooperating with said engaging means for maintaining said wrap-around cover in a locked condition on said reel regardless of dimensional variations of said reel and of said cover.

3. The device of claim 2 wherein said cooperating means includes teeth, and said engaging means includes teeth cooperating with said first mentioned teeth for maintaining said wrap-around cover in the closed condition on said reel.

4. The device of claim 3 wherein biasing means maintains both of said teeth sets together in the engaged and locked position.

5. The device of claim 2 wherein said means mounted on said overlap member includes a lip for engaging the second end portion to maintain it in the open position.

6. A device for locking together the first and second end portions of a wrap-around type tape reel cover, said device comprising an overlap member fixed to the first end portion of said cover, the second end portion of said cover being slidably received by said overlap member, an elongated slot having an inner terminal portion in the second end portion of said wrap-around cover, first ratchet teeth adjacent said terminal portion of said wrap-around cover, a retainer member fixed to said overlap member and engaging said slot, and cooperating ratchet teeth on said retainer member engaging said first ratchet teeth on said wrap-around member, said teeth being constructed and arranged to facilitate relative movement between said teeth when moving into locking engagement while resisting relative movement therebetween while in locking engagement.

7. The device of claim 6 wherein means are provided on said retainer member for disengaging the locking engagement between said teeth.

8. A device for locking the first and second end portions of a wrap-around type tape reel cover together, said device comprising an overlap member fixed to the first end portion of said cover, the second end portion of said cover being slidably received by said overlap member, said end portions being maintained in an aligned condition both in the open and closed positions by said overlap member, a longitudinal slot having an inner terminal portion in said second end portion, ratchet teeth at the terminal portion of said slot and being positioned transverse to said slot, a retainer member secured to the inner portion of said overlap member and projecting through said slot, cooperating ratchet teeth on said retainer member engaging said ratchet teeth on said wrap-around portion for maintaining said wrap-around cover in a locked condition, said ratchet teeth being constructed and arranged to permit relative movement therebetween to the locked position while resisting relative movement therebetween to the open position, and an outwardly projecting portion on said retainer member passing through said overlap member for moving said ratchet teeth out of engagement so that said cover may be moved to the open position.

9. The device of claim 8 wherein a spring member biases said ratchet teeth on said retainer member into cooperating engagement with said teeth on said wrap-around cover.

10. The device of claim 9 wherein said retainer member is provided with an outwardly projecting portion at the end opposite said ratchet teeth for engaging said second end portion when in the opened position, and said spring member biases said outwardly projecting portion into engagement with said second end portion.

References Cited

UNITED STATES PATENTS

| | | | |
|---|---|---|---|
| 1,488,322 | 3/1924 | Doty | 206—52 |
| 2,191,849 | 2/1940 | Debrte | 206—52 |
| 2,330,278 | 9/1943 | Gordon | 206—52 |
| 3,156,353 | 11/1964 | Harnish | 206—52 |

LOUIS G. MANCENE, *Primary Examiner.*